United States Patent Office 3,632,654
Patented Jan. 4, 1972

3,632,654
CYCLOALIPHATIC MERCAPTANS
Thomas Vincent Van Auken, Charleston, W. Va., and George Lewis Brode, Summerville, N.J., assignors to Union Carbide Corporation, New York, N.Y.
No Drawing. Filed Oct. 2, 1968, Ser. No. 764,597
Int. Cl. C07c *149/26, 153/07*
U.S. Cl. 260—609 D        10 Claims

ABSTRACT OF THE DISCLOSURE

Cycloaliphatic dimercaptans such as tricyclo[5.2.1.0$^{2,6}$] decane dithiol, which are useful as hardeners for epoxy resins and to cycloaliphatic monomercaptans, such as tricyclo[5.2.1.0$^{2,6}$]dec-3-ene thiol, which are useful as reactive diluents for epoxy resins. These mercaptans are produced by hydrolyzing thio carboxylates to the corresponding mercaptan derivative.

---

This invention relates to a method for the preparation of thiocarboxylates and mercaptans. This invention also relates to novel thiocarboxylates and mercaptans.

In one of its aspects the invention relates to a method for the preparation of polycyclic mercaptans by the reaction of a thiolcarboxylic acid with a polycyclic diolefin containing from 2 to about 8 aliphatic hydrocarbon rings therein, each ring being defined as the smallest member of covalently bonded carbon atoms which form a definable ring, which rings each contains 5 or 6 carbon atoms and each of the carbon to carbon double bonds is in a different ring.

In another aspect the invention relates to specially purified thiol carboxylic acid which results in a reaction with a higher exotherm and less color in the product.

In another aspect bicycloheptadiene is reacted by adding to excess thiol carboxylic acid in order to reduce the amount of nortricyclene thiocarboxylate formed.

In a further aspect the invention relates to the preparation of polycyclic mercaptans by the hydrolysis of the polycyclic thiocarboxylates produced in the first step of the reaction.

In another aspect the invention relates to novel thiocarboxylates and novel polycyclic mercaptans.

These and other aspects of our invention will be clarified in the following description.

In the basic process of our invention a thiolcarboxylic acid is reacted with a polycyclic diolefin containing from 2 to about 8 aliphatic hydrocarbon rings therein, each ring being defined as the smallest number of covalently bonded carbon atoms which form a definable ring, which rings each contain 5 or 6 ring carbon atoms, each of the carbon to carbon double bonds being in a different ring. The thiolcarboxylic acid contains up to about 7 carbon atoms. Examples of such acids are thiolacetic, thiolpropionic, thiolbutanoic and thiolbenzoic acids. Substituted thiolcarboxylic acids may also be used. Examples of such acids are monochloro-, dichloro-, and trichloro-thioacetic acids. The preferred thiolcarboxylic acid is thiolacetic acid.

The polycyclic diolefin reactants contains from 2 to about 8 aliphatic hydrocarbon rings therein, each ring being defined as the smallest number of covalently bonded carbon atoms which form a definable ring, which rings each contain 5 or 6 ring carbon atoms, and each of the carbon to carbon double bonds is in a different ring. Preferred diolefin reactants are those in which at least two of the rings are fused rings.

Illustrative of the polycyclic diolefins are the following:

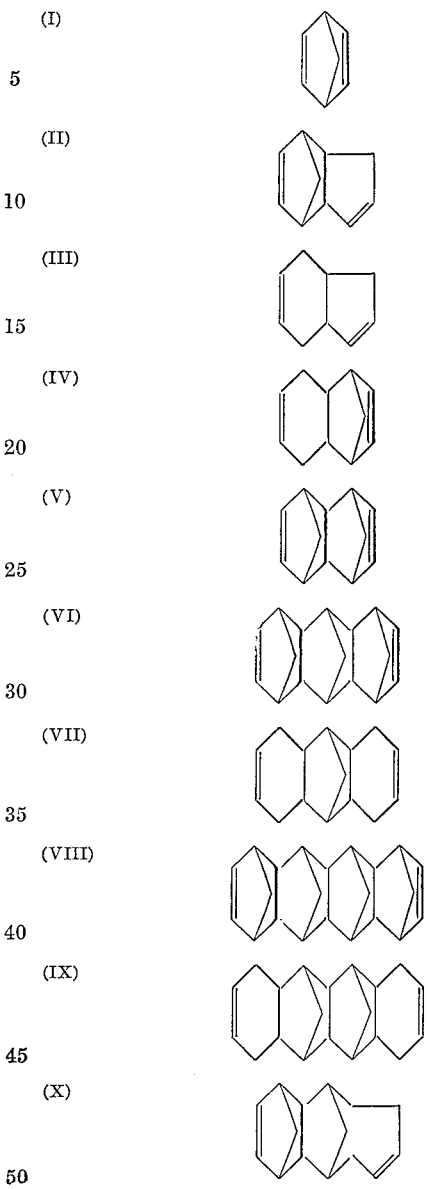

The polycyclic diolefin reactants used in our process may be prepared by Diels-Alder synthesis, generally using such commonly available starting materials as cyclopentadiene, butadiene, acetylene etc. and the simpler addition products resulting therefrom. For example, Compound I may be made by addition of acetylene to cyclopentadiene, Compound II by self-addition of cyclopentadiene, Compound III by addition of butadiene to cyclopentadiene, Compound IV by the addition of butadiene to norbornadiene, Compound V by the addition of one mole of cyclopentadiene to norbornadiene, Compound VI by the stepwise addition of two moles of cyclopentadiene to norbornadiene, Compound VII by the stepwise addition of two moles of butadiene to norbornadiene, Compound VIII by the stepwise addition of three moles of cyclopentadiene to norbornadiene, Compound IX by the stepwise addition of two moles of butadiene to Compound V, Compound X by the addition of cyclopentadiene to Compound II.

The temperature for the basic reaction can range from about —5° C. to about 80° C. and higher. The limits of the range are actually set by two factors. One is that lower than about —5° C. the reaction mixture starts to freeze. The other is that, at greater than about 80° C. thiolacetic acid, the preferred thiolcarboxylic acid, starts to boil. However, when using a higher boiling thiolcarboxylic acid, for example, thiolbenzoic acid, temperatures higher than 80° C. are desirable because the products of the process tend to crystallize at lower temperatures.

Atmospheric pressure is the preferred operating pressure. Higher or lower pressures may be used although no advantage is generally derived from use of such pressures. The material for the construction of the reactor is generally not critical, although it is advisable to avoid materials which react with the thiolcarboxylic acid or with hydrogen sulfide, a decomposition product of thiolcarboxylic acid.

The process may be run batchwise or in continuous fashion, for example, in a tubular reactor. The manner of addition of the two reactants, i.e., thiolcarboxylic acid and polycyclic diolefin, is generally not critical. However, it is preferred that the diolefin be added to the thiolcarboxylic acid, especially in the case where norbornadiene is the diolefin reactant. When norbornadiene is slowly added to an excess of the thiolcarboxylic acid, the production of the nortricyclene monothioacetate is minimized. By using this procedure, we have achieved 67 mole percent of the product as the bisthioacetate and only 33 percent as the thioacetoxynortricyclene. If this procedure is not followed the ratio of the thioacetoxynortricyclene to bisthioacetoxynorbornane may be as high as 70 to 30. The slow addition of polycyclic diolefin to thiolcarboxylic acid is also preferred as a method of maintaining the reaction temperature within the desired range. For example, with thiolacetic acid we prefer a reaction temperature range of from about 40° C. to about 50° C.

Novel thiolcarboxylates which may be prepared by the basic process are the following:

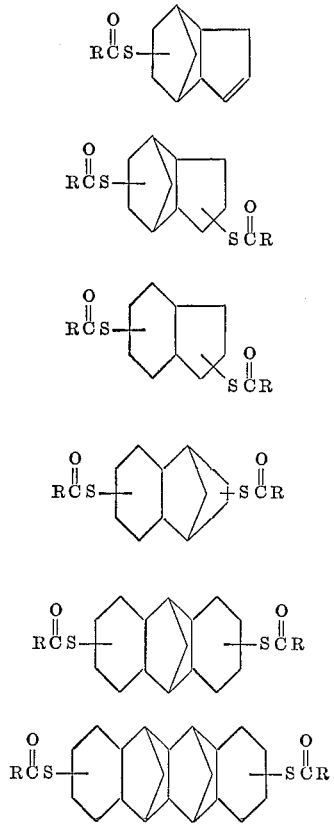

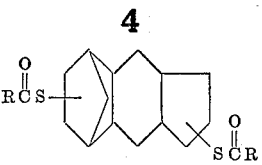

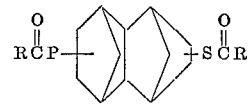

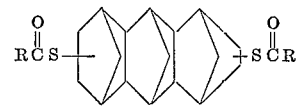

In the above formulas R is the moiety from the thiolcarboxylic acid

The preferred compounds are the first, second and third above-listed.

The polycyclic thiocarboxylate produced in the basic process may be hydrolyzed to the corresponding mercaptans.

The corresponding novel mercaptans which may be prepared by this process are the following:

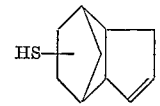

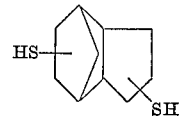

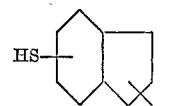

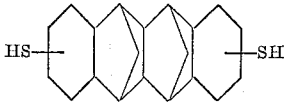

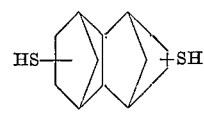

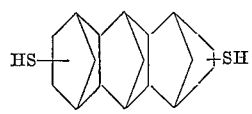

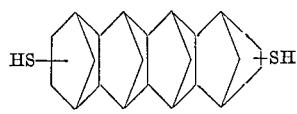

The preferred dimercaptans are the first, second and third. The novel mercaptans are polycyclic dimercaptans containing from two to about eight saturated aliphatic hydrocarbon rings therein, each ring being defined as the smallest number of covalently bonded carbon atoms which form a definable ring, which rings each contain 5 to 6 ring carbon atoms, at least 2 rings thereof are fused rings and the 2 mercapto radicals thereof are each bonded to a different carbon atom, each mercapto-bonded carbon atom being in a different ring.

The hydrolysis of the thiocarboxylates to form the mercaptans is either conducted stoichiometrically with a reasonably strong base such as sodium carbonate, sodium methoxide, sodium hydroxide or potassium hydroxide or with a catalytic amount of a medium to strong acid, preferably non-volatile and non-oxidizing, e.g., sulfuric acid, phosphoric acid, p-toluenesulfonic acid, benzenesulfonic acid and the like. The acid catalyzed hydrolysis is conducted by mixing the thiocarboxylate derivative with an excess of water or an alkanol of up to 5 carbon atoms, e.g., methanol, ethanol, n-propanol, n-butanol, n-pentanol or their possible isomers, adding the catalytic amount of acid and distilling the azeotrope of alkanol and alkyl carboxylate and the excess alkanol, the order of distillation depending on boiling points, of course. The acid-catalyzed hydrolysis is preferred and the use of an alkanol in that process is preferred. This process is cleaner than the stoichiometric base hydrolysis, giving less undesirable by-product.

Although for several reasons the novel process of this invention is the preferred process for the preparation of the novel dimercaptans, other processes may sometimes be utilized instead. For example, the polycyclic dimercaptans may be prepared by the free radical initiated reaction of hydrogen sulfide with a polycyclic diolefin containing from 2 to about 8 aliphatic hydrocarbon rings therein, each ring being defined as the smallest number of covalentely bonded carbon atoms which form a definable ring, which rings each contain 5 to 6 ring carbon atoms, at least 2 rings thereof are fused rings and each carbon to carbon double bond is in a different ring. The reaction of the polycyclic diolefin with hydrogen sulfide is generally effected with an excess of hydrogen sulfide. Preferably 10 to 20 moles hydrogen sulfide per mole of diolefin are used. The reaction is free radical initiated preferably using a chemical free radical initiator. Illustrative of the chemical free radical initiators which may be used are the azo compounds e.g. azobisisobutyronitrile and the like and is an oxide compound e.g. benzolperoxide, tertiarybutyl peroxide, and the like. If desired the reaction may be conducted in the presence of a suitable solvent. In many instances we have found that the use of a diluent results in a lessening of the amount of by-product produced. The use of a diluent is therefore preferred. Suitable diluents are, for example, the paraffinic hydrocarbons containing from 4 to 16 carbon atoms per molecule such as the butanes, pentanes, octanes, decanes and hexadecanes. We prefer to conduct the reaction in the liquid phase. Obviously when conducting a reaction in liquid phase, the reaction temperature must be below the critical temperature of hydrogen sulfide. The reaction temperature must also be within the range at which the chemical initiator initiates the reaction. It is preferred that the temperature be such that the reaction proceed neither too slowly nor too rapidly. Generally preferred temperatures are within the range of about 50 to about 100° C. The reaction products can be separated by any convenient means. Distillation is generally employed for the separation.

The process using $H_2S$ is not preferred because it frequently fails to give product, e.g., with

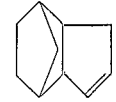

and

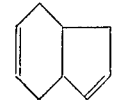

or it works poorly, e.g., with

Thiolcarboxylic acid, especially thiolacetic acid, works in all these cases, producing product in high conversions and yields.

The reaction employing thiolacetic acid is exothermic and so the diolefin should be added slowly or with cooling.

The reaction is conducted in the liquid phase, with the thiolcarboxylic acid functioning as a solvent in addition to its being a reactant. An additional, inert solvent may also be present, e.g., benzene or the paraffinic solvents.

It is highly preferred, as mentioned in the examples, to purify the thiolcarboxylic acid by reacting it with a minor amount, e.g., about 5-10%, of the diolefin reactant and then distilling off pure, colorless thiolcarboxylic acid. We have found that it is far easier to decolorize the acid than the thiocarboxylates or dimercaptans, which would be less desirable for many uses if colored. The so-purified acid may be used to initiate the reaction. Of course, the same purification takes place during the main reaction. Therefore, it is highly desirable to recycle unreacted acid.

The novel dimercaptans of this invention are useful as polymer intermediates as may be seen from the copending applications Ser. Nos. 764,638 filed Oct. 2, 1968 and 764,598 filed Oct. 2, 1968 of G. L. Brode and T. L. Pickering entitled Glycidyl Thioethers and Thermoplastic Sulfur-Containing Polymers being concurrently filed. In addition the dimercaptans may be polymerized with $SCl_2$ to form polytrisulfides. The dimercaptans are useful as epoxy hardeners and the monomercaptans are useful as reactive diluents for epoxy resins. The thiocarboxylates are, of course, useful as intermediates for the production of the dimercaptans and also find utility as intermediates for other purposes.

Throughout the application isomers have been indicated pictorially by a line between two ring carbons. Pure isomers may be used, but are difficult to obtain and offer no advantage. In fact, since the processes for the preparation of the dimercaptans result in a mixture of the indicated isomers and the mixture is a liquid, which is therefore easy to use, the mixture of isomers is preferred.

The mercaptans of our invention have very little of the obnoxious odor generally associated with mercaptans. Some have even a pleasant aroma. When cured in small amounts bisphenol A type epoxies are generally difficult to cure this is not the case with our epoxies. When cured in large masses bisphenol A type epoxies generally char.

The following examples are illustrative of our invention.

In the experiments described in the examples, infrared spectra were determined with a Perkin-Elmer Model 21 Infrared Spectrophotometer using neat samples. Nuclear Magnetic Reasonance spectra were determined on a Varian A-60 Nuclear Magnetic Resonance Spectrometer, in deuterochloroform unless otherwise noted. Mass spectra were determined on a Bendix Model 12 Time-of Flight Mass Spectrometer equipped with a 1-m. flight tube. Gas chromatographic analyses were run on an F and M Model 720 using thermal conductivity detectors, helium as carrier gas, and ¼ in. O.D. columns of the lengths specified. Temperatures reported for molecular distillations refer to the jacket temperature as it was not possible to determine a boiling point in this equipment.

Purification of thiolacetic acid

Dicyclopentadience was added slowly under nitrogen with stirring to thiolacetic acid until 5 mole percent had been added. The mixture was then held at 50° C. with stirring for 18 hours. Thiolacetic acid was then removed by flash distillation.

Efforts to distill through a column large quantities of thiolacetic acid, even under vacuum, always resulted in extensive decomposition, and sometimes in profuse evolution of hydrogen sulfide.

Amperometric titration of thiol functions with silver nitrate

The procedure used is a modification of the procedure of Kolthoff and Harris [Anal. Ed., 18, (1946)]. A sample of thiol between 80 and 130 mg. (depending on the expected equivalent weight) was weighed exactly into a 100 ml. volumetric flask, and diluted to the mark with benzene. A 10-ml. aliquot of this solution was added to 100 ml. of absolute ethanol and 5 ml. of a buffer solution (Note 1) in the titration cell, which was blanketed with nitrogen (Note 2). The sample was then titrated with 0.00500 N silver nitrate solution (Note 3). Points were taken throughout the titration, and lines were extrapolated to locate the end point.

Notes

*Note 1.*—The buffer solution was prepared by placing 8.0 g. of ammonium nitrate and 30.4 g. of conc. ammonium hydroxide in a flask, and diluting to 100 ml. with water.

*Note 2.*—The flow of nitrogen must not be too fast once the titration cell has been flushed, or else evaporation will cause a significant drop in temperature. A nitrogen blanket is essential since a substantial error can result due to disulfide formation in basic solution if oxygen is present.

*Note 3.*—The water used to prepare the silver nitrate solution should be deaerated to prevent disulfide formation. See Note 2.

EXAMPLE 1

Freshly distilled norbornadiene (73 g., 0.79 mole) was added dropwise to 600 g. (7.9 moles) of purified, distilled thiolacetic acid under a nitrogen atmtosphere, with stirring. The rate of addition was balanced against cooling with an ice bath to maintain a temperature of 40° C. When addition was completed and the exotherm had subsided, an oil bath was used to maintain the same temperature for 18 hours. Removal of excess thiolacetic acid under vacuum on a rotary evaporation left a residue of 188.3 g. A gas chromatographic analysis of the residue indicated a composition of 26% 2-thioacetoxynortricyclene

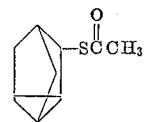

and 74% bis-(thioacetoxy)norbornane

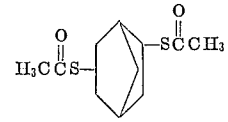

in two peaks (10% and 64% in order of elution).

Distillation of the residue through a 3-ft. spinning band column gave in the lower boiling fraction 43 g. (32%) of pure 2-thioacetoxynortricyclene, B.P. 64°/0.5 mm., retention time (10-ft., 5% SE-30 [silicone rubber sold by General Electric] on 50-60 mesh chromosorb at 200° C.) 3.6 min.

*Analysis.*—Calc'd for $C_9H_{12}OS$ (percent): C, 64.23; H, 7.19; O, 9.50; S, 19.05 (mol. wt. 168). Found (percent): C, 64.00, 63.76; H, 7.24, 7.04; O, 9.79, 10.00; S, 19.28, 19.21 (mol. wt. (mass spectrum), 168).

The infrared spectrum absorption showed bands at 3077, 823, 812, and 803 cm.$^{-1}$ (nortricyclene), 1684 cm.$^{-1}$ (C=O), and 633 cm.$^{-1}$ (C-S).

The higher boiling fractions gave 125 g. (66%); of bis-thioacetoxybicyclo[2.2.1]heptane, B.P. 92°/0.05 mm., gas chromatographic retention time (10-ft. 5% SE-30 on 50-60 Chromosorb G at 220° C.) 8.5 and 9.7 min.

*Analysis.*—Calc'd for $C_{11}H_{16}O_2S_2$ (percent): C, 54.05; H, 6.61; O, 13.09; S, 26.24 (mol. wt. 244). Found (percent): C, 54.32, 54.15; H, 6.67, 6.76; O, 13.4, 13.22; S, 26.02, 26.25

By careful distillation of this material on a 3-ft. spinning band column the material giving the gas chromatographic peak at 9.7 min. was obtained free of the more quickly eluted material, B.P. 95°/0.06 mm.

*Analysis.*—Found (percent): C, 54.28, 54.20; H, 6.61, 6.62; O, 13.06, 13.07; S, 26.15, 21.19 (mol. wt. (mass spectrum), 244).

The nuclear magnetic resonance spectrum of this material in deuterochloroform shows a six-line pattern at τ6.58 due to the protons on the carbon atoms bearing sulfur. When the spectrum is run in perdeuteropyridine, the separations between the lines of this pattern change. These changes are most easily interpreted in terms of a mixture of compounds. The material had infrared absorption (neat liquid) at 1684 cm.$^{-1}$ (C=O) and 633 cm.$^{-1}$ (C-S). There were no bands due to either double bond or nortricyclene.

The more rapidly eluted (8.5 min. gas chromatographic peak) material was not obtained as a fraction giving only one peak, but a sample containing at least 77% of this material was obtained, B.P. 78°/0.1 mm. The infrared spectrum (neat liquid) of this material showed absorption at 1689 and 1681 cm.$^{-1}$ (C=O) and 631 cm.$^{-1}$ (C-S). The spectrum showed no evidence for double bond or nortricyclene. It was generally similar to that of the longer retention time material but the two spectra differ in the 1230-1330 cm.$^{-1}$ region. The nuclear magnetic resonance spectrum showed a complex multiplet at τ6.2 due to protons on the carbon atoms bearing sulfur. There was a marked change in the pattern of this multiplet when the solvent was changed from deuterochloroform to perdeuteropyridine.

EXAMPLE 2

Bis-(thioacetoxy)bicyclo[2.2.1]heptane

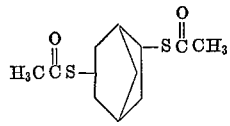

(463 g., 1.9 moles) in benzene (2.1) was added to 452 g. of sodium methoxide in methanol at 60° C. with stirring under a nitrogen atmosphere. The mixture was stirred for 18 hours at 60° C. under nitrogen. It was then cooled and poured into 6 l. of water. This was acidified to pH 3 with hydrochloric acid. The organic layer was separated, and the aqueous layer was extracted with three 1-l. portions of benzene. The benzene extracts were combined with the original organic layer, and the combined solution was washed with two 800-ml. portions of water and dried over magnesium sulfate. Removal of benzene under vacuum on a rotary evaporator gave 279 g. of a clear, yellow residue. Distillation of this material through a falling-film molecular still at 133°/1 mm. gave 249 g. (82%) of clear distillate, having an equivalent weight of 88 (thiol titration by silver nitrate). Careful distillation through a 3-ft. spinning band column gave an analytically pure sample of norbornane dithol

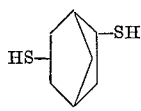

B.P. 100°/4.5 mm.

*Analysis.*—Calc'd for $C_7H_{12}S_2$ (percent): C, 52.43; H, 7.55; S, 40.02 (eq. wt. (SH), 80). Found (percent): C, 52.27, 52.50; H, 7.53, 7.52; S, 39.87, 40.05 (eq. wt. (SH titration) 81).

The infrared spectrum showed absorption at 2519 cm.$^{-1}$ (SH).

The material obtained in the highest boiling fraction of this distillation had an equivalent weight of 144 (thiol titration by silver nitrate), mol. wt. (thermoelectric), 183; and nuclear magnetic resonance spectrum with two sharp bands at $\tau$7.94 and 7.97. These data are compatible with a methyl sulfide.

EXAMPLE 3

A solution of 264 g. (2.0 moles) of dicyclopentadiene in 1 l. of benzene was added slowly to a solution of 152 g. (2 moles) of purified, previously distilled thiolacetic acid in 2 l. benzene heated at reflux and stirred under a nitrogen atmosphere. The addition required 6 hours. Heating and stirring were continued for an additional 18 hours. The benzene was then removed under vacuum in a rotary evaporator giving 397 g. of slightly colored residue. This residue was passed through a falling-film molecular still at 126°/0.7 mm. to yield 366 g. (88%) of thioacetoxytricyclo[5.2.1.0$^{2,6}$]dec-5-ene

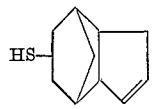

*Analysis.*—Calc'd for CHOS (percent): C, 69.19; H, 7.74; O, 7.69; S, 15.40 (mol. wt. 208). Found (percent): C, 69.32, 69.10; H, 7.59, 7.67; O, 8.00, 8.04; S, 15.42, 15.43 (mol. wt. (vapor phase osmometry) 146; mol. wt. (mass spect.) 208).[1]

The infrared spectrum of the compound showed absorption at 3058 cm.$^{-1}$ olefinic hydrogen, 1681 (thioester), 789, 785, 741, 714 (weak), and 689 (olefinic hydrogen) deformation, and 633 cm.$^{-1}$ (C–S). The prominent features of the nuclear magnetic resonance spectrum are given in Table I.

[1] This molecular weight was determined on a Consolidated Electrodynamics Corp. Model 21-130 Mass Spectrometer.

EXAMPLE 4

A solution of 208 g. (1.00 mole) of 8(or 9)-thioacetoxytricyclo[5.2.1.0$^{2,6}$]dec-3-ene

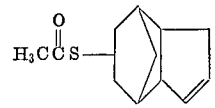

in 600 ml. of benzene was added under nitrogen to a solution of 113 g. (2.0 moles) of sodium methoxide in 1 l. of methanol and 400 ml. of benzene which was stirred and heated at reflux. After 20 hours of heating and stirring, the reaction mixture was allowed to cool, and it was then poured into 1500 ml. of water. The mixture was acidified to pH 3 with dil. hydrochloric acid, and the phases were separated. The aqueous phase was then extracted with two 400-ml. portions of benzene. The organic phase and the benzene extracts were combined, washed with two 100-ml. portions of water, and dried over magnesium sulfate. Removal of solvent under vacuum left a residue of 176 g. which on distillation in a falling-film molecular still at 126° C./5 mm. gave 155 g. (93.4%) of colorless tricyclo[5.2.1.0$^{2,6}$]dec-3-ene thiol

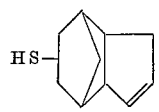

The nuclear magnetic resonance spectrum showed the presence of a small amount of benzene. Redistillation in the molecular still at 89° C./6 mm. gave material free of benzene.

*Analysis.*—Calc'd for $C_{10}H_{14}S$ (percent): C, 72.22; H, 8.48; S, 19.30 (eq. wt. (SH titration), 166.3; mol. wt., 166). Found (percent): C, 71.82, 71.85; H, 8.42, 8.50; S, 19.81, 19.69 (eq. wt., 172.4; mol. wt. (time-of-flight mass spectrum), 166).

EXAMPLE 5

Bis-(thioacetoxy)tricyclo[5.2.1.0.$^{2,6}$]decane, method A.—
From dicyclopentadiene Distilled dicyclopentadiene (94 g., 0.71 mole) was added dropwise to 551 g. (7.25 moles) of thiolacetic acid under a nitrogen atmosphere with stirring. The rate of addition was controlled to hold the temperature of the highly exothermic reaction at 40–45° C. When addition was complete, the reaction mixture was heated at 50° C. until a total reaction time of 18 hours has elapsed. Excess thiolacetic acid was removed under vacuum on a rotary evaporator leaving 207 g. of crude material. This material was distilled in a falling-film molecular still at 184°/2 mm. to give 189 g. (93.5%) of clear, slightly yellow bis-thioacetoxytricyclodecane

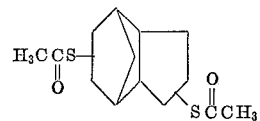

*Analysis.*—Calc'd for $C_{14}H_{20}O_2S_2$ (percent): C, 59.11; H, 7.09; S, 22.55 (molecular weight, 284). Found (percent): C, 59.02, 59.05; H, 7.02, 6.97; S, 22.51, 22.66 (molecular weight, 277±3%).

The infrared spectrum showed absorptions at 1684 cm.$^{-1}$ (thioester) and 633 cm.$^{-1}$ (C–S). The principal features of the nuclear magnetic resonance spectrum are shown in Table I.

Method B.—From thioacetoxytricyclo[5.2.1.0$^{2,6}$]dec-3-ene

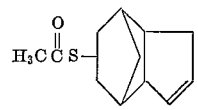

To 705 g. (9.25 mole) of thiolacetic acid stirred under an atmosphere of nitrogen 383.1 g. (1.84 mole) of thioacetoxytricyclo[5.2.1.0²,⁶]dec-3-ene was added dropwise. After the addition of about 15 ml., a sunlamp was used to raise the temperature to 40° C., and then the rate of addition was used to maintain this temperature without the lamp. Addition required 2½ hours. The temperature was then raised to 50° C. by means of an oil bath, and held there for 18 hours. Removal of thiolacetic acid under vacuum on a rotary evaporator left a residue of 522 g. Distillation of the material through a falling-film molecular still in two passes at 150°/0.2 mm. and 184°/0.1 mm. gave a total of 468.5 g. (89.8%) of bis-(thioacetoxy)tricyclo[5.2.1.0²,⁶]decane

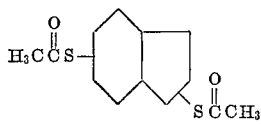

which had identical infrared and nuclear magnetic resonance spectra with material prepared by Method A.

TABLE I.—N.M.R. SPECTRA OF THIOLACETATES AND THIOLS

| Compound | Chemical shift (τ) | | | |
|---|---|---|---|---|
| | —S—C—H | CH₃—S—C(O)— | HS— | H H / —C=C— |
| 6 | 6.3 (m) | 7.73 (s) | | |
| 7 | 6.3 (m) | 7.72 (s) / 7.74 (s) | | |
| 8 | 6.5 (m) ᵃ | 7.78 (s) | | 4.30 (s, m) ᵇ |
| 1 | 7.0 (m) | | (ᶜ) | |
| 2 | 6.9 (m) / 7.5 (m) | | 8.25 (d) ᵉ / 8.35 (d) ᵉ | |
| 3 | 3.1 (m) | | 8.40 (d) ᵉ | 4.4 (m) |

ᵃ This signal cannot be assigned with certainty because of complications due to the presence of allylic hydrogens.
ᵇ One olefinic proton appears to be a multiplet while the other appears to be a singlet.
ᶜ Could not be distinguished.
Note.—(s)=singlet (d)=doublet (m)=multiplet.
ᵉ J=6 C.P.S.

EXAMPLE 6

A solution of 657.5 g. (2.32 moles) of bis-(thioacetoxy) tricyclo[5.2.1.0²,⁶]decane

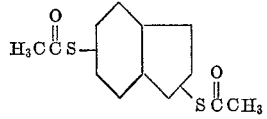

in 3 l. of benzene was added slowly under nitrogen to a solution of 216 g. (4.0 moles) of sodium methoxide in 6 l. of methanol held at 60° C. and stirred. After addition the solution was heated at reflux for two days. The cooled solution was then poured into 3 l. of water and acidified with hydrochloric acid to pH 3. The layers were separated, and the aqueous layer was extracted with two 1-l. portions of benzene. The benzene extracts and the original organic layer were combined, washed with two 400-ml. portions of water, and dried over magnesium sulfate. Removal of solvent under vacuum gave 452 g. of a viscous yellow liquid which when distilled through a falling-film molecular still at 198° C./0.1 mm. gave 431 g. (92.9%) of tricyclo[5.2.1.0²,⁶]decane-3 (or 4), 8 (or 9) dithiol. This material could be distilled at 80° C./0.05 mm. after the initial molecular distillation. Apparently the first distillation removes some very high boiling material which significantly elevates the boiling point. After one distillation the material showed a high equivalent weight (by silver nitrate titration of thiol groups) and gave elemental analyses slightly high in carbon. Repeated molecular distillations gave an analytically pure sample.

*Analysis.*—Calc'd for C₁₀H₁₆S₂ (percent): C, 59.93; H, 8.05; S, 32.01 (eq. wt. (SH titration), 100.2; mol. wt., 200). Found (percent): C, 59.98, 60.14; H, 8.00, 8.13; S, 31.92, 31.62 (eq. wt. (SH titration), 103.0; mol. wt. (time-of-flight mass spectrum), 200).

Some tricyclodecanedithiol

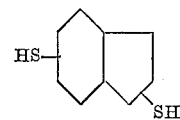

which had been refined by molecular distillation was distilled through a 3-ft. spinning band column to produce a sample having B.P. 91° C./0.08 mm. and eq. wt. (SH titration) 104.5. The last fraction of this distillation showed virtually the same boiling point, but had eq. wt. (SH titration) 172.3 and mol. wt. (time-of-flight mass spectrum) 214.

EXAMPLE 7

Distilled bicyclo[4.3.0]nonadiene (240 g., 2.0 moles) was added dropwise to 1520 g. (20 moles) of thiolacetic acid with stirring under a nitrogen atmosphere. By balancing the rate of addition and cooling from a cold water bath the reaction temperature of this highly exothermic reaction was maintained at 50° C. When addition of the bicyclononadiene was complete, this temperature was maintained by means of an oil bath until the total reaction time amounted to 18 hours. Removal of excess thiolacetic acid under vacuum left 613 g. of crude product. Distillation of this material in a falling-film molecular still at 184° C./0.1 mm. gave 594 g. (109%) of bis-thioacetoxybicyclononane

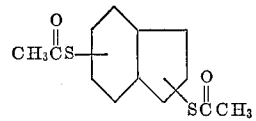

*Analysis.*—Calc'd for C₁₃H₂₀O₂S₂ (percent): C, 57.31; H, 7.40; O, 11.74; S, 23.54 (mol. wt., 272). Found (percent): C, 57.75; 57.79; H, 7.16, 7.34; O, 12.00, 11.80; S, 23.54, 23.38 (mol. wt. (time-of-flight mass spectrum), 272).

The infrared spectrum of the compound showed absorption at 1681 (thioester) and 636 cm.⁻¹ (C–S). There were no bands at any strength in the 900–650 cm.⁻¹ olefinic deformation region. The principal features of the nuclear magnetic resonance spectrum are given in Table 1.

EXAMPLE 8

A solution of 560 g. (2.0 mole) of bis-(thioacetoxy)-bicyclo[4.3.0]nonane in 2 l. of benzene was

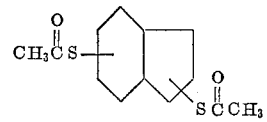

added under nitrogen to a solution of 350 g. (6.5 moles) of sodium methoxide in 3 l. of methanol heated at reflux. Heating and stirring were continued for 18 hours. The cooled reaction mixture was then poured into 6 l. of water and acidified to pH 3 with dil. hydrochloric acid. The phases were separated, and the aqueous phase was extracted with two 1-l. portions of benzene. The benzene extracts and the original organic layer were combined, washed with two 600-ml. portions of water, and dried over magnesium sulfate. Removal of the solvent under vacuum gave 411 g. of viscous liquid which on distillation through a falling-film molecular still at 198° C./2.5 mm. gave 358.7 g. (95.1%) of bicyclo[4.3.0]nonane dithiol

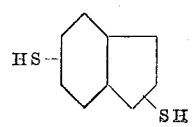

The material had a high equivalent weight (SH titration) and gave analytical results high in carbon. Repeated molecular distillations did not remedy this, but an analytical sample was obtained by distillation of a portion through a 3-ft. spinning band column. This material had B.P. 68–71° C./0.07 mm.

*Analysis.*—Calc'd for CHS (percent): C, 57.39; H, 8.56; S, 34.05 (eq. wt. (SH titration), 94.2; mol. wt., 188). Found (percent): C, 57.80, 57.75; H, 8.42, 8.46; S, 33.67, 33.66 (eq. wt. (SH titration), 95.0; mol. wt. (time of-flight mass spectrum) 188).

The infrared spectrum showed absorption at 2519 cm.$^{-1}$ (SH). The principal features of the nuclear magnetic resonance spectrum are given in Table I.

What is claimed is:

1. The composition of the formula:

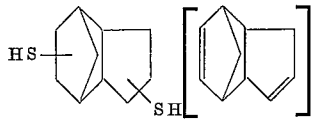

2. The composition of the formula:

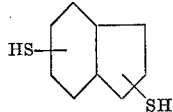

3. The composition of the formula:

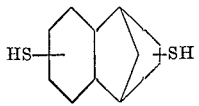

4. The composition of the formula:

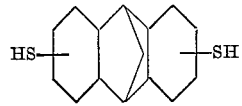

5. The composition of the formula:

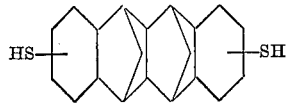

6. The composition of the formula:

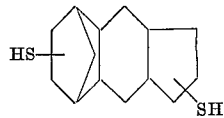

7. The composition of the formula:

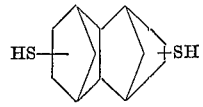

8. The composition of the formula:

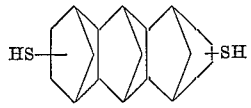

9. The composition of the formula:

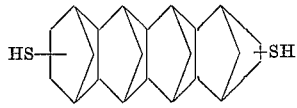

10. The composition of the formula:

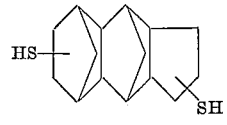

References Cited

UNITED STATES PATENTS 3,025,327  3/1962  May et al. _____ 260—609

OTHER REFERENCES

Reid "Chemistry of Bivalent Sulfur," vol. I, (1958), pp. 29 and 30.

CHARLES B. PARKER, Primary Examiner

D. R. PHILLIPS, Assistant Examiner

U.S. Cl. X.R.

260—47 EC, 47 EP, 79.7, 455 C, 502.6, 608

PO-1050
(5/69)

UNITED STATES PATENT OFFICE
CERTIFICATE OF CORRECTION

Patent No. 3,632,654          Dated January 4, 1972

Inventor(s) T.V. Van Auken & G.L. Brode

It is certified that error appears in the above-identified patent and that said Letters Patent are hereby corrected as shown below:

Formula X in column 2, lines 47 to 50, should read:

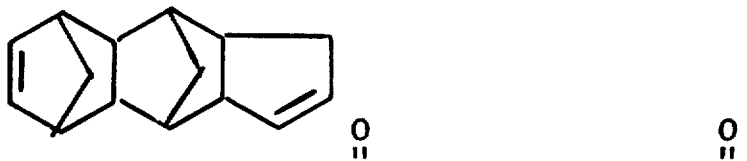

Column 4, line 9, the group RCP- should read --RCS-

Column 13, claim 1, the following should be deleted from the claim

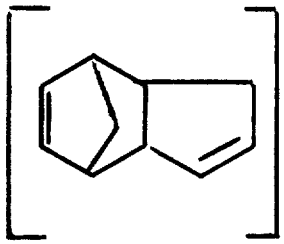

Signed and sealed this 30th day of May 1972.

(SEAL)
Attest:

EDWARD M. FLETCHER, JR.
Attesting Officer

ROBERT GOTTSCHALK
Commissioner of Patents